United States Patent Office

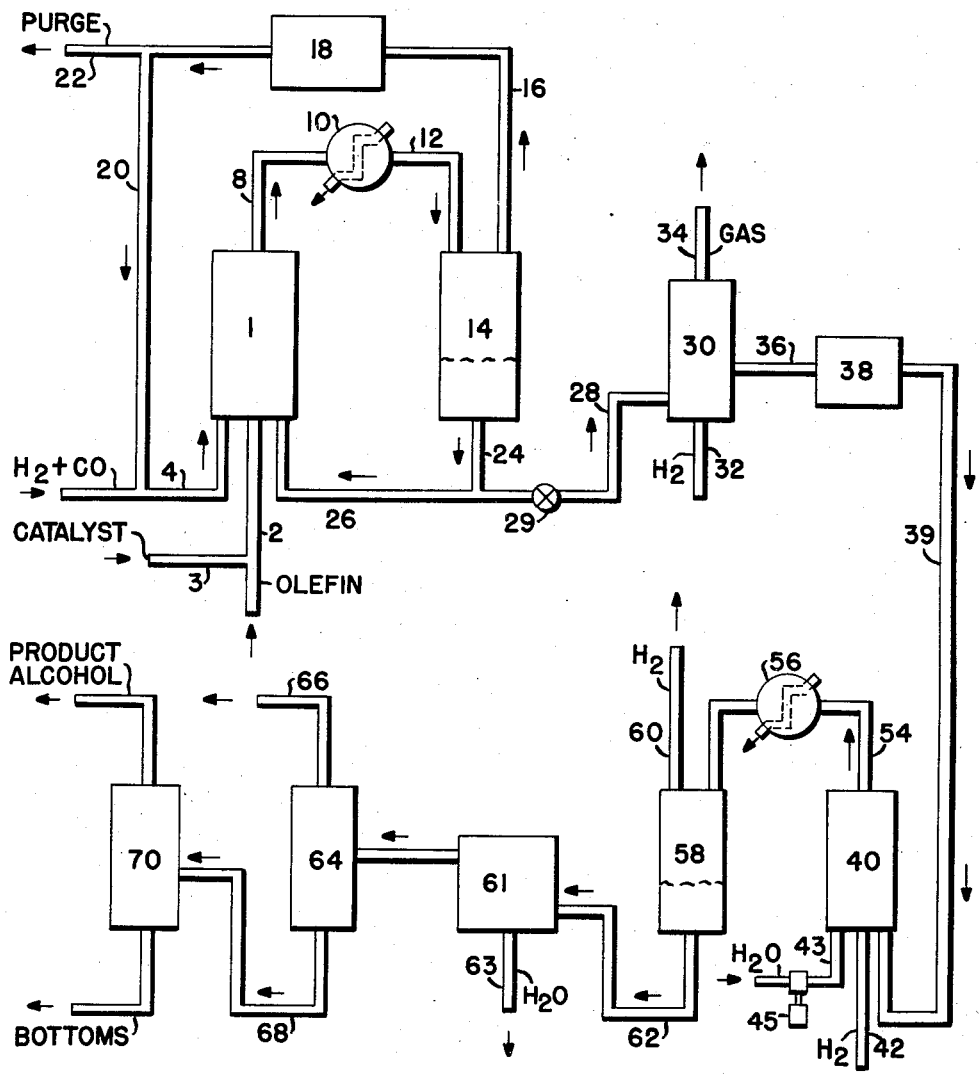

2,840,619
Patented June 24, 1958

2,840,619

HYDROGENATION CATALYST AND USE IN OXO PROCESS

Ralph Burgess Mason, Denham Springs, and Rhea N. Watts, St. Francisville, La., assignors to Esso Research and Engineering Company, a corporation of Delaware Application July 25, 1956, Serial No. 600,130

6 Claims. (Cl. 260—638)

The present invention relates to the preparation of oxygenated organic compounds by the reaction of olefinic carbon compounds with hydrogen and carbon monoxide in the presence of a carbonylation catalyst. More specifically, this invention relates to an improved process for increasing the selectivity of the process to useful alcohols, and the maintenance of a high level of activity of the hydrogenation catalysts while improving the strength of the catalyst employed in hydrogenating the aldehyde produced in the first stage of the reaction.

This application is a continuation-in-part of the application, Serial Number 353,590, filed May 7, 1953, and now abandoned.

It is now well known in the art that oxygenated organic compounds may be synthesized from olefinic organic compounds by reaction of the latter with carbon monoxide and hydrogen in the presence of a catalyst containing cobalt or other carbonylation catalyst in an essentially three-stage process. In the first stage the olefinic material, catalyst, and synthesis gases are reacted under pressure to give a product consisting predominantly of aldehydes containing one more carbon atom than the olefinic material, as well as a certain amount of secondary reaction products, polymeric material, etc. This oxygenated organic mixture, which contains in solution compounds of the metal catalyst may be treated in a second stage with heat to cause decomposition and removal of the soluble catalytic material from the organic mixture. The catalyst-free material may then be hydrogenated in a hydrogenation stage to the corresponding alcohol, or it may be oxidized to the corresponding carboxylic acid.

This carbonylation reaction provides a particularly attractive method for the preparation of valuable primary alcohols, which find large outlets, particularly as intermediates for plasticizers, detergents, and solvents. Not only long and short chained olefinic hydrocarbons, but also, most other types of organic compounds containing at least one olefinic double linkage, such as unsaturated acids, esters, alcohols, ketones, etc., are susceptible to this type of reaction.

The catalyst for the first stage of the reaction, where olefinic material is converted into aldehydes, is usually added in the form of salts of the catalytically active metal with high molecular weight organic acids, such as oleic, stearic, naphthenic, etc. Examples of such catalyst salts or soaps are cobalt oleate, stearate, naphthenate and the like. These salts are soluble in the liquid olefin or olefin-paraffin feed, and may be supplied to the first stage as dissolved in the feed or as hydrocarbon solution.

As the synthesis gases are consumed at equivalent or equimolar rates, synthesis gas components are usually added at equimolar proportions of $H_2$ and $CO$, though it has been suggested to use both an excess of hydrogen and an excess of $CO$. The conditions for reacting olefinic compounds with hydrogen and carbon monoxide vary somewhat in accordance with the nature of the olefinic feed, but the reaction is generally conducted at pressures of about 3000 pounds per square inch and at temperatures in the range of about 200°–450° F. The ratio of synthesis gas feed to olefin may vary widely; in general, about 1000 to 15000 cubic feet of $H_2+CO$ per barrel of olefin feed are employed.

At the end of the first stage, when the desired conversion of olefins to oxygenated compounds has been effected, the products and the unreacted material are generally withdrawn to a catalyst removal zone, where dissolved catalyst is removed from the mixture by thermal treatment.

From the carbonylation catalyst removal zone the aldehyde product is passed to a hydrogenation zone for conversion to alcohols. The hydrogenation stage may be a fixed bed operated at conventional hydrogenation conditions which include temperatures, pressures and gas and liquid feed rates approximately within the ranges specified above for the first stage. It is to the catalytic treatment of the aldehyde product, in particular to the nature of the hydrogenation catalyst, that the present invention applies.

In the past it has been suggested to employ as Oxo hydrogenation catalyst, such catalysts as nickel, cobalt, copper chromite, oxides and sulfides of tungsten and molybdenum, etc. all of which may be, if desired, supported on a suitable carrier. All of these catalysts, however, have not been entirely satisfactory, due to the nature of the carbonylation reaction and to the products present in the stream to the hydrogenation plant.

An important problem involved in the aldehyde-alcohol synthesis process is the presence of water in amounts up to as much as 10% in the hydrogenation zone. Water results in part from the nature of the secondary reactions occurring in the first stage. Thus, aldehydes may in part be further reduced in the first stage to form alcohols which in turn react with further quantities of aldehydes, with water formed as a by-product. Similarly, Cannizzaro type reactions followed by esterification produce water, as also intra and intermolecular dehydration.

However, not only is water formed in the first stage of the process, but it also has been found that hydrogenation itself is considerably improved when water in amounts up to 10% is added to the hydro stage. The selectivity to the desired alcohols is significantly increased, the water possibly functioning to repress acetal formation and alcohol dehydration.

With the presence of water in the hydrogenation stage it becomes necessary, therefore, to employ a catalyst that is not affected by water, either in activity or in physical strength. High mechanical strength is of particular importance in commercial operations which involve the use of fixed catalyst beds of considerable height and weight to which the lower catalyst layers are subjected. In addition, the hydrogenation stage is a liquid phase operation in which catalyst is subjected to the action of high velocity liquid streams which tend to disintegrate the catalyst, leading to channeling and plugging in the reactor when a structurally weak catalyst is employed. The need of a water-resistant catalyst of satisfactory activity, which may be used at conditions conducive to substantially complete conversion of aldehydes into alcohol, therefore, has been strongly felt in the synthesis art. The present invention fills this need.

A step forward in the art was taken by the proposal that sulfactive catalyst suitably supported, such as molybdenum sulfide on activated carbon, be employed. These types of catalyst have the necessary mechanical strength, but in general require higher reaction temperatures than metal catalyst, and too high temperatures decrease alcohol selectivity. Also, they have the disadvantage that when they are freshly sulfided or regenerated for an extended period of time, the resultant alcohols are contaminated with sulfur and require rerunning, and this tendency exists until the sulfided catalyst has come into equilibrium with the alcohol.

A further problem encountered with the use of sulfactive catalysts is that, in particular when relatively low molecular weight aldehydes are hydrogenated, excessive amounts of hydrocarbons are formed, due to the relatively high hydrogenation temperatures required. These hydrocarbons are very difficult to separate by distillation and fractionation, for some of the hydrocarbons boil in the range of the alcohol product. Thus, when a butylene fraction is passed as feed to the carbonylation stage to form a mixture of amyl aldehydes, and this material is hydrogenated over a sulfactive catalyst consisting of 10% molybdenum sulfide supported on activated char, and alcohol product contaminated with 5–10% hydrocarbons, most of which boil in the alcohol range, is obtained. On the other hand, when catalysts such as nickel or copper chromite are employed to hydrogenate such aldehyde product, substantially lower temperatures may be employed, little or no hydrocarbon is formed in the hydrogenation, but the catalysts have very poor physical strength, particularly in the presence of water, which is a desirable additive to aid alcohol selectivity. This is clearly shown in the data below:

HYDROGENATION OF $C_5$ OXO ALDEHYDES

[5–10 wt. percent added water. 3 liter shaker autoclave unit.]

| Catalyst | Com. Nickel | Copper Chromite | Molybdenum Sulfide on Char. |
|---|---|---|---|
| Type Hydrogen | Electrolytic | Methanized Commercial | |
| Temperature, °F | 350 | 450 | 450 |
| Pressure, P. s. i. g | 1,800 | 2,900 | 2,600 |
| Hours of Run | 6 | 6 | 6 |
| Product Carbonyl No | 0.7 | 5.1 | 1.5 |
| Wt. Percent Hydrocarbons in Distilled Alcohol | <1 | <1 | 8.0 |
| Used Catalyst Crushing Strength, Lbs.: | | (complete catalyst disintegration.) | |
| Maximum | 4 | | 36.0 |
| Minimum | 2 | | 20.0 |
| Average | 3.2 | | 27.2 |

It is the principal purpose of the present invention, therefore, to provide an improved catalyst for the hydrogenation of aldehydes formed by the carbonylation reaction.

A more specific purpose and object of the present invention is to improve the operation of the liquid phase hydrogenation stage of the alcohol synthesis process, particularly when water is present.

It is a still further object of the present invention to prepare catalysts suitable for hydrogenating aldehydes, particularly in the presence of water, which shall have retained essentially their full activity while having been treated so as to increase their physical strength.

Other and further objects and advantages of the invention will appear hereinafter.

In accordance with the present invention, the aldehyde product from the first stage of the synthesis is hydrogenated in the liquid phase in the presence of a hydrogenation catalyst prepared by pelleting conventional hydrogenation catalysts, such as nickel, copper chromite, copper metal, cobalt chromite and the like, with a metallic bonding agent to form a pellet which, on heat treatment, near or at the activation temperature of the catalyst, forms a catalyst of high activity and physical strength, which will not disintegrate in the presence of water, as the unbound catalyst, and catalysts pelleted by conventional methods, such as mechanical pilling with punches and dies, or extrusion of pastes followed by drying will, nor will it show reduced activity.

In the hydrogenation of aldehydes selectively to alcohols, copper chromite catalysts have shown great promise except that pellets formed by conventional procedures quickly disintegrate in service. This condition is aggravated by the presence of water, which is frequently added to the process. The use of metal binders in pilling, which prevent pill disintegration in service, even in the presence of water while still maintaining a high degree of catalyst activity, is a means of securing the benefits of the high selectivity of this catalyst without its disadvantages.

For example, a copper chromite catalyst prepared by the Adkins technique disintegrated almost completely in the autoclave hydrogenation of a $C_5$ oxo aldehyde at 450° F. with 10% water present. Also, the disintegration was of the same magnitude when the operation was conducted in the absence of added water. The same catalyst pilled with 20% aluminum and then heated in hydrogen for 7 to 8 hours at approximately 850° F. but for a short period at about 1200° F. was not deactivated nor did it disintegrate in the more severe condition with water present. Furthermore, the used catalyst had an average side crushing strength of 9.4 pounds as compared to 8 pounds for the preparation with aluminum prior to the heat treatment and 4.2 pounds for the preparation without aluminum.

The employment of copper, nickel, and cobalt chromite hydrogenation catalysts is well known in the art; even in the comparatively recent Oxo art, the use of these catalysts has been proposed. However, as pointed out, it has been found that the process of making the catalyst plays a vital role in the suitability of the catalyst for the continuous Oxo hydrogenation service, for the stronger the catalyst the longer may the operation be carried out.

In general, in the present invention, hydrogenation catalysts of the reduced metal or mixed oxide type, such as copper chromite, usually requiring an activation following reduction with hydrogen, may be employed. A suitable method for introduction of a metal binder such as aluminum may consist in the usual thermal treatment or activation, following which the finely divided binder is mechanically mixed with the catalyst component and the mixture subjected to heat treatment at or near the activation temperature of the catalyst. Alternatively the non-activated catalyst may be mixed with the binder, and the mixture subjected to heat treatment at or near the activation temperature of the catalyst.

A suitable bonding agent is aluminum. Metals whose melting or sintering points are markedly above or below the activation temperature of the hydrogenation catalysts are considerably less desirable in that the catalyst must either suffer deactivation or fail to be properly bonded during the sintering treatment necessary for bonding the metal and catalyst.

It is well known in the art that for certain hydrogenation processes, copper oxide serves as the catalytic oxide. Pellets have been produced in which the copper oxide is bonded to high melting metals such as nickel, and iron. However, the high temperatures needed for proper bonding of catalyst and metal tend to deactivate the catalyst. Indeed under certain operating conditions which require an extremely strong pellet, it has been expedient to sacrifice some of the catalytic activity in the interests of producing a strong pellet.

The present invention offers a method of producing a catalyst pellet of great strength, while not adversely effecting the catalytic activity. Hence, a hydrogenation catalyst of undiminished activity and superior strength qualities is produced. Such a combination is particularly advantageous in liquid phase hydrogenation reactions.

Though substantially any hydrogenation catalyst may be thus bonded by finely-divided metals, the most useful application of the present invention is with supported reduced metal catalysts and with mixed oxide hydrogenation catalysts.

The process of the invention in all its stages may be carried out by conventional means in any suitable equipment. The design and operation of such equipment will be briefly described hereinafter with reference to the accompanying drawing which illustrates schematically a suitable system of this type.

Referring now to the figure, an olefinic hydrocarbon having one carbon atom less than the number of carbon atoms in the desired resulting alcohol and containing dissolved a catalyst promoting the reaction of olefinic compounds with carbon monoxide and hydrogen to form oxygenated organic compounds is fed to the lower portion of primary reactor 1 through feed line 2. Any conventional type catalyst such as cobalt stearate, naphthenate, oleate, iron linoleate, etc., may be used. Catalyst make-up dissolved in olefin feed may be added to the main olefin feed line 2 through line 3. The concentrations of catalyst and the proportions of the catalyst-containing feed to the non-catalyst containing feed are such that the concentration of catalyst in the total olefin feed varies between 0.1 to 5.0% by weight, preferably about 1% by weight of catalyst salt to olefin.

Simultaneously a gas mixture containing hydrogen and carbon monoxide in the approximate ratio of 0.5 to 2.0 volumes of hydrogen per volume of carbon monoxide is supplied through line 4 and is fed to primary reactor 1. Reactor 1 is preferably operated at about 3000 p. s. i. g. and at a temperature of from about 250–450° F. The reactor may contain no packing, or may be packed with catalytically inert solid material, as ceramic rings, pumice, and the like.

Reactor 1 is preferably operated at a temperature of from about 250°–450° F., depending upon the nature of the olefin feed and other reaction conditions. The rate of flow of synthesis gases and olefins through reactor 1 is so regulated that the desired conversion level of the olefinic material is obtained.

A mixture of liquid oxygenated reaction products containing in solution unreacted olefins, dissolved catalyst, unreacted synthesis gases, and secondary reaction products is withdrawn overhead from reactor 1 and is transferred through line 8, and cooler 10, and line 12, to high pressure separator 14, where unreacted gases are withdrawn overhead through line 16, scrubbed in scrubber 18 of entrained liquid, and used in any way desired. They may be recycled to synthesis gas feed line 4 via line 20 for use in adjusting the desired $H_2$ partial pressure and for adjusting the $H_2/CO$ ratio in the feed to reactor 1. If desired, only a part of the gases from separator 14 may be thus employed. The balance may be purged from the system through line 22.

A stream of liquid mixture comprising primary reaction product, unconverted olefins and secondary reaction products, and containing relatively high concentrations of cobalt carbonyl as well as other cobalt compounds and complexes, and which may contain up to 3% or more water, resulting at least in part from secondary reactions as described heretofore, is withdrawn from separator 14 through line 24. A portion of said withdrawn stream may be recycled, if desired, to reactor 1 via line 26 to aid in cooling and maintenance of temperature control of the primary carbonylation stage. The balance of the primary reaction product may be withdrawn through line 28, pressure release valve 29, and thence to decobalting zone 30 wherein by suitable heat treatment at about 200°–400° F., the dissolved cobalt carbonyl is decomposed to metallic cobalt and cobalt compounds. A stream of hydrogen-comprising gas may be admitted through line 32 to aid in stripping and removing CO resulting from the decomposition of the metal carbonyl. Zone 30 may be operated at high pressure, though pressures of 15–200 p. s. i. g. may also be employed. The gas stream comprising CO and $H_2$ may be removed from zone 30 through line 34. This gas stream may advantageously be employed in the subsequent hydrogenation step. Other methods of cobalt removal, as by thermal treatment with water, steam, or dilute organic acids, may also be employed.

The liquid product from the decobalter 30 is withdrawn through line 36 and may be passed to filter 38 for removal of suspended solids, thence through line 39 to the lower portion of fixed bed hydrogenator 40. Simultaneously, hydrogen is supplied to reactor 40 through line 42 in proportions sufficient to convert the aldehyde product to alcohols. Reactor 40 contains a fixed bed of hydrogenation catalyst prepared in the manner as described above. Suitable operating conditions include pressures of 2000–4000 p. s. i. g., and temperatures of from 300°–500° F., depending upon the nature of the aldehyde product being treated. Feed rates (liquid) of about 0.25–1.5 v./v./hr. and $H_2$ feed rate of 5,000–10,000 standard cubic feet/barrel of liquid feed may be employed.

Preferably, water is injected into hydrogenator 40 through line 43 and pump 45. The amount of water added may be as much as 10 vol. percent of the liquid feed to hydrogenator 40. Water addition may be continuous or intermittent. The rate of addition is determined to some extent by the rate of decobalter feed addition, and the water may, if desired, be preheated prior to injection. The catalyst of the present invention, because of its ruggedness, permits this beneficial injection of water. Other catalysts, as shown subsequently, are rapidly deactivated and disintegrated by the presence of water. Water may increase the alcohol selectivity 10% or even higher. However, it may not under certain circumstances, be necessary or desirable to add water.

The products of the hydrogenation reaction may be withdrawn overhead through line 54, then through cooler 56 into high pressure separator 58, where unreacted hydrogen may be withdrawn overhead through line 60 for further use in the system, if desired. Liquid products are withdrawn from liquid-gas separator 58 through line 62 and passed to settler 61, where water may be withdrawn through line 63, and the upper alcohol-containing layer passed to hydrocarbon still 64, where low-boiling products, mostly hydrocarbons boiling below the alcohol product desired are distilled overhead. Thus, when $C_7$ olefin fraction is the feed to carbonylation reactor, generally the product boiling up to 340° F. is removed as a heads cut in hydrocarbon still 64. This material may be withdrawn overhead through line 66 and may be used as a gasoline blending agent. The bottoms from this primary distillate are withdrawn from still 64 and sent through line 68 to alcohol still 70 where product alcohols boiling in the desired range may be removed overhead by distillation at atmospheric or reduced pressures, depending upon their molecular weight. The bottoms from this distillation may be further processed or, if desired, may be used as fuel.

The invention may be further illustrated by the following specific examples which point out clearly the advantages realized when operating with the catalyst of the present invention.

*Example I*

The following data show the superiority of aluminum bonded nickel hydrogenation catalysts over the same catalyst without the binder:

OXO ALDEHYDE FEED 6-HOUR AUTOCLAVE HYDROGENATION
350° F., 2600–2800 P.S.I.G.

|  | A | B | C | D |
|---|---|---|---|---|
| Aldehyde Type | $C_8$ | $C_8$ | $C_8$ | $C_8$ |
| Catalyst Binder | Al | Al | None | None |
| Wt. Percent Binder | 10 | 20 |  |  |
| Wt. Percent Water on Feed | 10 | 10 | 0 | 5 |
| Product Carbonyl No.[1] | 1.6 | 1.0 | 0.7 | 0.7 |
| Weight Percent Alcohol Yield | 69 | 66 | 56.7 |  |
| Used Catalyst—Side Crushing Strength, Lbs.: |  |  |  |  |
| Maximum | 14 | 26 | 10 | 4 |
| Minimum | 6 | 14 | 4 | 2 |
| Average | 11 | 20.2 | 6.2 | 3.2 |

[1] Aldehyde reduction at 1800 p. s. i. g.

The aluminum bonded catalyst may be particularly beneficially employed in the presence of water and a comparable degree of hydrogenation is obtained as evaluated by the carbonyl number. Furthermore, because of the beneficial effect of the added water, a considerably enhanced alcohol yield is realized. The effect of water on unbonded nickel is shown in columns C and D above, and it is seen that the aluminum bonded catalysts, even after operation with 10% water in the feed, was stronger than the unbonded catalysts after operation without the added water.

The highest strength of the metal bonded catalyst is obtained by reducing the pill preparation with hydrogen and then raising the temperature to a sintering level for a short period. Thus, illustrative of this technique are the following data:

HYDROGENATION OF C8 OXO PRODUCT ((10% ADDED WATER)

[6-hour autoclave operation, 2600-2800 p. s. i. g., 350° F. Commercial nickel catalyst pilled with 10% aluminum.]

| Operation | Reduction Conditions | | Product Carbonyl Number | Used Catalyst Strength, Pounds | | |
|---|---|---|---|---|---|---|
| | Hrs. | Temp., °F. | | Avg. | Max. | Min. |
| 1 (Col. A Above) | 8<br>8 [1] (0.25)<br>8 [1] (2) | 850<br>850 [1] (1,200)<br>850 [1] (1,200) | 1.6<br>0.7<br>--- | 11<br>12.6<br>16.4 | 14<br>18<br>20 | 6<br>8<br>10 |

[1] Values in parentheses are conditions (hours or temperature) in addition to 8 hours at 850° F.

Not only is copper chromite a better catalyst when bonded in accordance with the present invention than the unbonded material, but also, the aluminum bonded copper chromite is far superior to the same catalyst bonded by such agents as, for instance, sodium silicate. In Example II, below, there are shown results obtained when a copper chromite catalyst prepared in the conventional manner, described in detail below, is bonded with aluminum and when a similar catalyst is bonded with sodium silicate. Not only are higher crushing strengths obtained by the product of the invention, but also, lower carbonyl numbers are realized.

*Example II*

AUTOCLAVE HYDROGENATION OF C₈ ALDEHYDE (10% ADDED WATER)

[Copper chromite catalyst (20 wt. percent on feed). 6-hour operation 2600-2900 p. s. i. g., 450° F.]

| | 1 | 2 | 3 |
|---|---|---|---|
| Catalyst Binder | Aluminum (20%) | Sodium Silicate | |
| Product Carbonyl No. | 1.1 | 3.6 | --- |
| Used Catalyst Insp.—Avg. Side Crushing Strength, Lbs. | 11.8 | 1.8 | 2 |

The binder is usually expressed on the basis of active component composition, that is, copper chromite with 20% aluminum consists of a hundred parts of copper chromite and twenty parts of aluminum. It is normally desirable to keep the amount of binder to a minimum and, although aluminum in 20% concentration has been used above and shown to give excellent results, a 10% concentration also has been found to operate satisfactorily. In general, the final catalyst composition comprises 100 parts of active catalyst plus the minimum parts of powdered metal which is found effective to extend the useful life of the catalyst.

Although, because of the lack of strength of the unbonded copper chromite, it has not been found feasible to maintain a continuous unit in operation therewith, because it was not possible to maintain contact between catalyst and reactants, it has been found possible to compare in a continuous operation the aluminum bonded copper chromite embodiment of the present invention with a copper chromite catalyst supported on silica gel. A copper chromite-silica gel catalyst was prepared from copper nitrate and chromium trioxide. Also, a copper chromite catalyst was prepared from the same starting materials, but silica gel was replaced by an aluminum binder. As will be seen in Example III below, the silica gel-supported copper catalyst gave very poor results in the continuous operation whereas the preparation of the invention gave excellent performance in the hydrogenation of both amyl and octyl aldehydes.

*Example III*

| Catalyst | Copper Chromite Silica Gel | Copper Chromite Aluminum | |
|---|---|---|---|
| Run No. | A | B | C |
| Run Hours | 1-10 | 1-8 | 89-96 |
| Catalyst Age, Hr. | 53.5 | 112 | 245 |
| Oxo Product | C₅ | C₈ | C₈ |
| Temperature, °F. | 451 | 443 | 437 |
| Liquid Feed Rate, v./v./hr. | 0.49 | 0.5 | 0.5 |
| Product Carbonyl No. | 127 | 2.6 | 7 |
| Selectivity, Mole Percent Alcohols | 34 | 80.2 | 76.9 |

In another set of experiments, the aluminum bonded copper chromite catalyst above was purposely poisoned with sulfur which decreased its activity, but as shown in Example IV, below, in spite of this poisoning, its performance is superior to that of an unbonded nickel catalyst which was not likewise sulfur poisoned.

*Example IV*

CONTINUOUS UNIT HYDROGENATION OF C₈ OXO ALDEHYDES

[Commercial hydrogen]

| Catalyst | Nickel-Kieselguhr | | Copper Chromite | | (20% Al Binder) |
|---|---|---|---|---|---|
| Catalyst Age, Hr. | 177 | 193 | 112 | 245 | 374 |
| Temperature, °F. | 425 | 449 | 443 | 437 | 500 |
| Feed Rate, v./v./hr. | 0.9 | 1.0 | 0.5 | 0.5 | 0.5 |
| Water Rate, Percent | 6 | 5 | 5 | 5 | 5 |
| Carbonyl No. | 14 | 7 | 2.6 | 7 | 13 |
| Total Catalyst Age, Hrs. | 193 | | --- | --- | 374 |

Catalyst condition poor, estimated 50% disintegration; good, essentially no disintegration.

In the example above, under comparable conditions of operation the aluminum bonded copper chromite catalyst maintained its activity over a period of 245 hours whereas the unbonded nickel required increasing temperatures to maintain performance. Furthermore, after deliberate sulfur contamination (at hour 245) the bonded copper chromite showed activity (at hour 374) at which time the run was discontinued. Even with this harsh treatment, the copper chromite remained in good physical condition.

The copper chromite catalysts employed in the present invention were prepared by two methods, described below:

PREPARATION A

Nine hundred ml. of solution (at 80° C.) containing 260 g. of trihydrated copper nitrate and 31 g. of barium nitrate were added to 900 ml. of a solution (at 250° C.) containing 151 g. of ammonium dichromate and 225 ml. of 28 percent ammonium hydroxide. The precipitate was filtered, pressed, and sucked as dry as possible. The product was dried in an oven at 75° C. to 80° C. for twelve hours and then pulverized. It was decomposed in three portions in a casserole over a free flame. In carrying out the decomposition, the powder was continuously stirred with a spatula and the heating so regulated that the evolution of gases did not become violent. During this process the color of the powder changed from orange to brown and finally to black. When the entire mass had become black, the evolution of gases ceased, and the powder was removed from the casserole and allowed to cool. The combined product was then leached for thirty minutes with 600 ml. of 10% acetic acid solution, filtered, and washed with 600 ml. of water in six portions, dried for twelve hours at 125° C., and pulverized. The yield of catalyst was 170 g. The temperature of decomposition must be carefully controlled in order to produce a highly active, uniform product.

The final product prior to metal bonding had the following composition:

| | Percent |
|---|---|
| BaO | 9.4 |
| CuO | 44.0 |
| $Cr_2O_3$ | 46.6 |

The activated catalyst was thereafter mixed with aluminum powder in the proportion of 4 parts of catalyst per part of aluminum and thereafter pilled into ⅛" pellets. The aluminum powder was then caused to bond with the activated catalyst by sintering the catalyst-aluminum mixture in the presence of hydrogen, for a period of 7½ hours at 850° F., a temperature at or near the activation temperature of the catalyst.

PREPARATION B 5061 grams copper nitrate and 2099 grams chromic acid were dissolved in 8400 cc. of distilled water. The materials were stirred in a crock until solution was complete. 4778 cc. of 28% ammonium hydroxide were slowly added with stirring. The slurry was then agitated for one hour. Filtration was carried out in a vacuum Buchner funnel. The filter cake was reslurried in 12 liters of hot distilled water. The slurry was filtered and the cake dried at 250° F. After drying over night, the whole was put through a four-mesh screen and returned to evaporating dishes and further dried over night. Decomposition was effected in an eight-inch evaporating dish over an open flame. A $KA_2$ wire screen, 100-mesh, was used to cover the dish to prevent powder from blowing out during decomposition. After the initial decomposition was complete the catalyst was heated to 1200° F. in an electric muffle furnace.

Yield: 2903 grams.

The ignited material was thereafter mixed with aluminum powder in the ratio of 4:1 and was pilled into ⅛" pellets. The pellets were then heated in the presence of hydrogen for 4 hours at a temperature of 1200° F., thereby causing bonding to occur at or near the activation temperature of the catalyst.

The bonded nickel catalysts were prepared by decomposing nickel carbonate supported on kieselguhr (70% nickel reduced metal basis). The carbonate is decomposed by roasting at about 850° F., thereafter the decomposed material was mixed with aluminum powder and pilled.

What is claimed is:

1. In the process for the production of alcohols by catalytic hydrogenation of a liquid carbonylation aldehyde product in the presence of water at temperatures from about 300° F. to about 500° F., and pressures from about 2000 to 4000 p. s. i. g., the improvement which comprises carrying out said hydrogenation with a catalyst prepared by pelleting a hydrogenation catalyst component selected from the class consisting of metal oxides and metals from reduced metal oxides mixed with finely divided aluminum, aluminum having a sintering point at a temperature in the range of the activation temperature of the catalyst, 850° to 1200° F., and heating the resulting pellet in the presence of hydrogen at temperatures in the range of about 850° to 1200° F. so that the finely divided aluminum becomes sintered and bonded to the catalyst component in the pellets, thereby producing a catalyst of high strength and of undiminished catalytic activity.

2. In the process defined by claim 1, the aluminum being present in an amount of 10 to 20 parts per 100 parts by weight of said hydrogenation catalyst component mixed therewith.

3. In the process defined by claim 1, said catalyst being prepared to contain nickel from a reduced nickel oxide as the hydrogenation catalyst component mixed with finely divided aluminum as the bonding metal.

4. In the process defined by claim 1, the hydrogenation catalyst component being copper chromite and the bonding metal being finely divided metallic aluminum.

5. A catalyst which comprises 100 parts of a nickel hydrogenation catalyst pelleted with 10 to 20 parts of finely divided aluminum, the finely divided aluminum being sentered and bonded to the active nickel catalyst.

6. A catalyst which comprises a hydrogenation catalyst selected from the class consisting of metal oxides and metals from reduced metal oxides pelleted with finely divided aluminum having a sintering point at a temperature in the range of the activation temperature of the hydrogenation catalyst, 850° to 1200° F., said finely divided aluminum being sintered and bonded to the hydrogenation catalyst by a heat treatment of the pellet at said activation temperature range in the presence of hydrogen.

References Cited in the file of this patent

UNITED STATES PATENTS

| 2,136,509 | Jenness | Nov. 15, 1938 |
|---|---|---|
| 2,163,602 | Jenness | June 27, 1939 |
| 2,331,292 | Archibald et al. | Oct. 12, 1943 |
| 2,604,455 | Reynolds et al. | July 22, 1952 |
| 2,638,488 | Cerveny | May 12, 1953 |

FOREIGN PATENTS

| 1,023,436 | France | Dec. 30, 1952 |
|---|---|---|
| 629,312 | Great Britain | Sept. 16, 1949 |

OTHER REFERENCES

Mantell: "Adsorption" (2nd edit., 1951), McGraw-Hill, New York, N. Y., pp. 91, 92.